Jan. 10, 1961 S. P. COLE ET AL 2,967,778
METHOD FOR MAKING JUICE CONCENTRATES
Filed Aug. 20, 1957
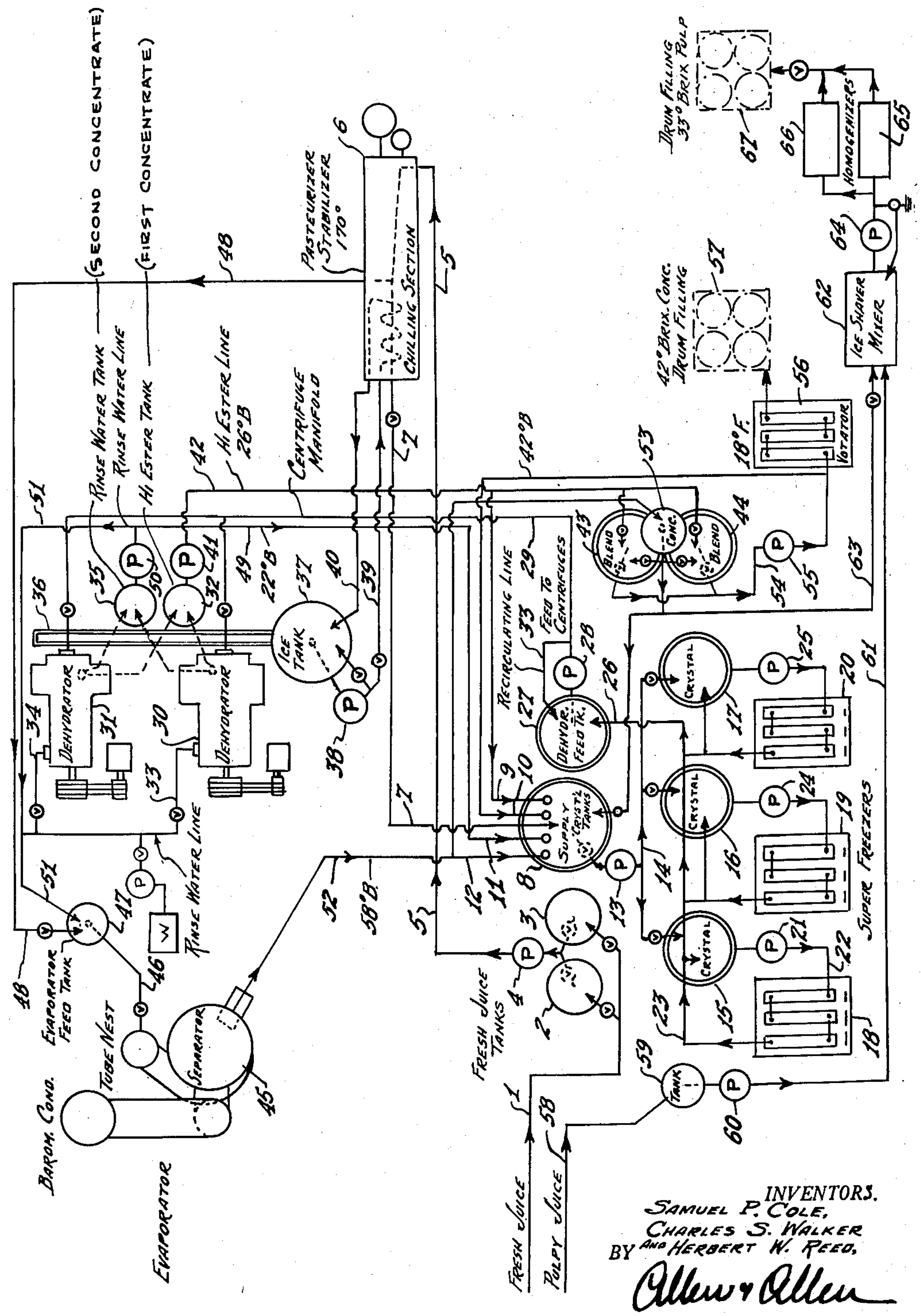
INVENTORS.
SAMUEL P. COLE,
CHARLES S. WALKER
AND HERBERT W. REED,
BY Allen & Allen
ATTORNEYS.

United States Patent Office 2,967,778

Patented Jan. 10, 1961

2,967,778

METHOD FOR MAKING JUICE CONCENTRATES

Samuel P. Cole, Orange City, Charles S. Walker, Clearwater, and Herbert W. Reed, Eustis, Fla., assignors to Institutum Divi Thomae Foundation, Cincinnati, Ohio, a corporation of Ohio Filed Aug. 20, 1957, Ser. No. 679,319

9 Claims. (Cl. 99—205)

The invention relates to the manufacture of concentrated juices which may be stored under appropriate conditions, shipped to a point of use, and there reconsituted by the addition of water so as to provide a beverage product of normal strength and high flavor. The method and apparatus herein described may be used for the production of concentrated juices of citrus fruits such as orange, lemon, grapefruit, lime and the like, various juices of deciduous fruits including but without limitation apple, pear, peach, pineapple and the like, and to other beverage liquids such as milk, coffee, etc. The invention will be described herein in connection with the manufacture of a concentrate of orange juice of about 42° Brix, requiring for reconstitution the addition of three volumes of water, it being understood that this is exemplary only of the invention and within the limits of the teachings hereinafter made. Other concentrates of other Brix values and requiring different amounts of water for reconstitution may be made from natural orange juice or other beverage materials as set forth above.

Attempts have long been made to produce orange juice concentrates by evaporating water from natural orange juice. This is ordinarily done under vacuum, and may be done at various temperatures. In one procedure the evaporation is conducted under high vacuum with the temperature never being allowed to rise above about 80° F. This so called "cold pack" process produces a material which is characterized by relative freedom from off-flavor, whereas a "hot pack" process in which the temperature is allowed to rise higher tends to produce off-flavor. Either type of process, however, produces a product in which, while the fruit sugars and acids of the original juice are present, the essential flavoring characteristics or esters of the natural juice have been virtually destroyed or driven off.

George S. Sperti, in Patent No. 2,588,337, dated March 11, 1952, taught a process for concentrating juices in which the juice was first subjected to freezing conditions in order to form ice crystals therein, and the unfrozen liquid was then separated as a concentrate from the ice crystals, preferably by centrifuging. The concentrate so separated contained not only a substantial part of the solids of the frozen juice but also practically all of its volatile flavor constituents. The residue ice could then be thawed and concentrated by evaporation to recover sugars and other constituents and form a second concentrate. This concentrate could be added to the first in forming a finished product.

In an application copending herewith entitled Continuous Process and Apparatus for Making Concentrated Liquids, Serial No. 489,325, filed February 21, 1955, Charles S. Walker, one of the inventors herein taught an essentially continuous procedure and apparatus for forming Sperti type concentrate. The initial freezing was characterized by continuous recirculation which controlled the crystal growth so as to provide a semi-frozen material suitable for continuous centrifugation; but the procedure still involved the melting of the ice, and the formation by evaporation of a second concentrate from it which was blended with the first concentrate.

It is an object of the present invention to provide an improved, simplified and less expensive procedure for the formation of relatively high Brix concentrates.

It is an object of the invention to provide a method and means for forming a concentrate by that type of procedure in which the juice is frozen and from which ice is separated which concentrate contains substantially all of the solids of the original juice, but, without involving the melting of the ice and the recovery of values from it by an evaporative procedure.

It is an object of the invention to provide a means and a method whereby a concentrate containing substantially all the valuable solids can be separated from an ice residue which has substantially no Brix reading at all.

It is an object of the invention to provide a means and a method for forming a concentrate in which method the residue ice is used to cool the raw juice preferably as a part of the pasteurization thereof, the resultant water being discarded.

Other objects of the invention have to do with the provision of process and apparatus improvements all as set forth hereinafter.

These and other objects of the invention which will be later outlined or will be apparent to one skilled in the art upon reading these specifications are accomplished by that procedure and in the use of that apparatus of which the aforesaid exemplary embodiment will now be described in detail. The entire following specification constitutes an example of the use of the invention in the best form now known. Reference is made to the accompanying drawings which illustrate a diagrammatic example of apparatus with which the invention may be practiced.

If a high Brix value is desired, repetition or continuation of the first concentration procedure may be practiced, but it is simpler and less expensive to blend the concentrate with a juice concentrate either "hot pack" or "cold pack" produced by evaporation.

To illustrate, let it be supposed that a concentrate of 42° Brix is desired. Where evaporative concentrates have been used in the past, it has been the practice to make them to a higher Brix value, say about 58°, and then to dilute them back to 42° Brix with ordinary untreated orange juice so as to restore some of the flavor. A 42° Brix product would be attained by the addition of about 80 gallons of natural orange juice to about 300 gallons of the evaporative concentrate; but this would give a reconstituted product containing only about 12% of the flavor of natural orange juice.

In the procedure of this invention it is readily possible continuously and cheaply to make a concentrate of say 26° Brix, in which all of the flavor characteristics are retained. Such a concentrate, volume for volume, contains about 2.29 times the flavor in natural orange juice. In forming a 42° Brix concentrate by blending the high flavor 26° Brix concentrate and a 58° evaporative concentrate, the proportions are half and half. Such a 42° Brix concentrate will normally be reconstituted on a 1:4 basis, i.e. by the addition of 3 volumes of water. But it will be seen from these figures that the reconstituted juice will contain 30% of the esters and volatile flavoring characteristics of natural orange juice, volume for volume. It has been found that the quantity of flavor esters in natural orange juice is well above the level which can be appreciated by the taste buds. If a reconstituted product volume for volume contains 30% of the ester content of average, natural orange juice, it is acceptable as full flavored. As the ester content rises, only the most discriminating tasters can detect any difference between 30% and 45%, while above 45% no difference can be detected by taste. The reconstituted products of this invention are not normally distinguishable from fresh, natural orange juice.

Turning now to the accompanying drawings, the freshly squeezed orange juice enters the system in a conduit marked 1 and is delivered selectively to two or more fresh juice tanks marked 2 and 3. It will be understood that the oranges after being washed are delivered to known automatic juicing machines wherein the juice is squeezed from them together with a substantial portion of the pulp. The greater part of the pulp is then removed by a standard pulp remover, the juicing devices and pulp remover not being illustrated herein. The juice entering the conduit 1 will be understood to contain only that amount of fine pulp which is desired in the final concentrate.

A pump 4 having valved connections with both of the tanks 2 and 3 delivers the fresh juice through a conduit 5 to a pasteurizer 6. In the first part of this pasteurizer, indicated as the stabilizer, the orange juice is rapidly heated to a temperature of 170° F. or somewhat higher, and then is as rapidly chilled in the other part of the pasteurizer marked "chilling section" by being brought into heat exchange relationship with cold water from a source hereinafter to be explained. From the pasteurizer the juice passes at a temperature of about 34° F. through a conduit 7 to a supply tank 8 for the crystallizing systems later to be described.

At the start of the process it has been found desirable to adjust the Brix of the incoming juice after pasteurization. As is well known the Brix value of natural orange juice is itself variable, ranging roughly from about 10° to 13°. The juice will be frozen in swept surface heat exchangers. If the Brix value of the juice is too low, the juice freezes sooner and the ice process becomes more critical. If on the other hand the Brix value is too high, the ice crystals become too fine in the process and difficulty is had with the centrifuging. It is necessary that the frozen juice be in the form of a pumpable slurry, and the crystals must therefore be fine enough to permit pumpability. The coarser the crystals the less solids will be entrained or occluded on their surfaces after the centrifugation. The crystal size is in any event quite small, being less than about 1/32 inch in the greatest dimension. The frozen orange juice has somewhat the consistency of soft sherbert; and an experienced operator can judge the crystal size by the way in which the material tends to pile up in the crystal tanks hereinafter described and can make appropriate adjustments. There should be some pile-up, so long as the material remains pumpable. As indicated the Brix value is important in the matter of crystal size. In the practice of the invention the incoming juice should be adjusted to a Brix value of about 12° to 15°. The preferred adjusted Brix value is about 14°.

The Brix value of the raw juice is ordinarily adjusted by the addition of some portion of the 26° Brix first concentrate produced in the invention; and the drawing shows a conduit 9 whereby some of this concentrate may be introduced into the supply tank 8. Also entering the supply tank is a conduit 10 which may be used to introduce some of the 42° Brix final product if desired. A conduit 11 also is capable of delivering "second concentrate" as hereinafter described to the supply tank 8. A supplementary conduit connection 12 is capable of delivering some of the 58° Brix evaporative concentrate if desired.

The adjustment of the juice may be accomplished in accordance with Brix tests, which may be rapidly done on standard equipment. However, schedules may be worked out depending on the material used for adjustment. If the 42° Brix final concentrate is used for adjustment such a schedule is as follows:

350 gal. of 10.0° Brix+50 gal. 42° Brix=400 gal. 14° Brix
350 gal. of 10.5° Brix+43.75 gal. 42° Brix=393.75 gal. 14° Brix
350 gal. of 11.0° Brix+37.50 gal. 42° Brix=387.50 gal. 14° Brix
350 gal. of 11.5° Brix+31.20 gal. 42° Brix=381.20 gal. 14° Brix
350 gal. of 12.0° Brix+25.0 gal. 42° Brix=375 gal. 14° Brix
350 gal. of 12.5° Brix+18.70 gal. 42° Brix=368.70 gal. 14° Brix
350 gal. of 13.0° Brix+12.5 gal. 42° Brix=362.5 gal. 14° Brix
350 gal. of 13.5° Brix+ 6.25 gal. 42° Brix=356.25 gal. 14° Brix
350 gal. of 14.0° Brix+ 0.0 gal. 42° Brix=350 gal. 14° Brix As a supplement to, or instead of, the adjustment of the Brix value by the addition of juices or concentrates or both as set forth above, it does not constitute a departure from the invention to adjust the Brix value in whole or in part by the addition of sucrose, corn syrup, or other sugar-containing materials or mixtures thereof.

The supply tank 8 has a refrigerated jacket, and in it the supply of adjusted juice has its temperature brought down to about 30° F. It is equipped for agitation.

A pump 13 delivers the pasteurized and adjusted juice from the supply tank 8 through a valved manifold 14 to any of a pluralty of cold-jacketed crystal tanks 15, 16 and 17. Each of these tanks in in closed-circuit relation to a swept-surface heat exchanger or superfreezer 18, 19 or 20. The superfreezers may take various forms, but a type of apparatus known as the Votator and exemplified by the Girdler Patent No. 1,783,864 and others is satisfactory. In the practice of the invention, three-tunnel freezers have been employed and are indicated diagrammatically in the drawing. In these superfreezers the temperature of the adjusted juice is reduced to about 21° to 25° F. It will be understood that the material in this temperature range exists in the form of a slurry of ice crystals in a liquid. So long as adequate agitation is maintained the material remains pumpable. Coalescence of the ice crystals into a solid mass does not occur until a temperature of 18° F. or lower is attained. The valves in the manifold 23 are spring loaded. Consequently the pumps are able to maintain the slurry under pressure in the superfreezers. This assists in maintaining mobility in the slurry in spite of rapid cooling.

The crystal tanks 15, 16 and 17 are cold jacketed, and the jackets of these tanks, the jackets of other tanks in the system such as the supply tank hereinabove described, the tank for feeding the centrifuges and the final blend tank or tanks, and the jackets of the votators or superfreezers are cooled by a conventional refrigerating system (not illustrated), preferably one employing brine as a circulating medium.

The slurry or partially frozen juice is withdrawn from tank 15 and delivered by pump 21 through conduit 23 to tank 15 or to another crystal tank in the system. Similarly there is a closed recirculating system for crystal tank 16 and superfreezer 19 including the pump 24 and a closed circulating system for crystal tank 17 and superfreezer 20 including the pump 25. The pumps 21, 24 and 25 may be any pumps capable of handling and pumping materials of the mushy or slurry character of the frozen juice. Piston pumps have not been found satisfactory nor have ordinary centrifugal pumps. However, the slurry may be handled by Waukesha centrifugal positive pumps, Moyno pumps, gear pumps and the like.

The adjusted fresh juice is bled in to the circulatory systems just described through the manifold 14, and an equivalent amount of the slurry is bled out of the systems through manifold 26 and delivered to the dehydrator feed tank 27 which is also a cold jacketed tank. Features of control in the crystal forming systems include control of the speed of recirculation, control of the bleeding in of adjusted fresh juice and the bleeding out of the slurry, and the like. The consistency of the slurry can be watched at the crystal tanks 15, 16 and 17 since these are open top vessels. It is here that the pile-up described above can be observed. The crystal tanks and the dehydrator feed tank are provided with motor driven agitating means, such preferably as exert a scraping action on the cold walls of the vessels. It will be understood that in the arrangement shown the bleeding in and bleeding out need not be continuous as to any one recirculatory system. The fresh adjusted juice is bled in at a temperature of about 30° F. while the slurry is bled out at a temperature about 21° to 25° F.

From the dehydrator feed tank 27 the slurry is delivered by a pump 28 through a conduit 29 to the dehydrators or centrifuges of which two have been shown indicated at 30 and 31. These centrifuges may be of various types, horizontal basket types being preferred. The baskets of these centrifuges are perforated with small holes or provided with screen walls. The precise size of the perforations is not a necessary limitation, although it is intended that the centrifuge basket retain all of the ice crystals. Plural-screen baskets may be employed. Perforations of .030 inch will be found satisfactory. The liquid centrifuged away from the ice crystals is, in the exemplary embodiment, an orange juice concentrate of 26° Brix, and is full flavored. The liquid separated by centrifuging, i.e. the first concentrate, is delivered by conduits shown in dotted lines to a concentrate tank 32.

Since each centrifuge passes through a set cycle of operations, it is advantageous to have more than one of the machines. Two have been shown, but more may be employed if desired. Each centrifuge as required is fed with slurry through the conduit 29 by means of the pump 28. A recirculating line 33 may be provided around the pump to assist in the agitation of the slurry when feeding is not taking place. The length of time of the feed cycle will determine the amount of slurry introduced into the basket, particularly where spring loaded valves are used in the feed line. In a particular centrifuge the feed cycle may be, say, 15 seconds. At the end of this or other appropriate interval the feeding is stopped, and the basket is spun for an appropriate length of time, say 48 seconds in the particular exemplary embodiment. This removes from the ice crystals all of the first concentrate which has been associated with them excepting that which actually clings to the surface of the ice crystals too tightly to be removed by the centrifugal force. Enough liquid containing valuable solids clings to the ice, however, to require removal and recovery.

Thus, depending upon the size of the crystals, there will be some of this liquid left on the crystals. It has been found that it is possible to displace the liquid clinging to the crystals by treating the crystals with water in controlled amounts and under centrifugal conditions. The centrifuges are provided with inlets within the basket for water; and as the third cycle of the centrifugation water will be delivered to the ice in the basket. In the exemplary operation which is being outlined, the water delivery occupied 3 seconds, after which as a fourth cycle the centrifuge was spun for another 48 seconds.

The action which takes place is believed to be one of displacement. Under centrifugal conditions the delivered water merely takes the place of the occluded or clinging liquid on the surface of the crystals, the liquid being driven off. Ordinary tap water may be used for the operation, or water from any potable source; and it may be used at ordinary room temperatures or up to about 75° F. or higher. By carefully apportioning the water in the operation, the liquid may be taken off at substantially full strength. Thus if the first concentrate removed in step 2 of the centrifuging cycle is a concentrate of 26° Brix value, the material removed in step 4 of the cycle, hereinafter referred to as the second concentrate, may have a 24° Brix value. Thus it will be seen that there is very little melting of the ice, which can be explained by the fact that the ice in the centrifuge will be well below freezing temperature, namely generally in the range of 21° to 25° F. Despite the fact that the second concentrate removed in the fourth step of the cycle may have a Brix value of around 24°, the remaining ice, if melted, can have 0° Brix value, and the process is preferably so carried out as to attain this end. A valuable feature of the preferred form of the invention is the attainment of an ice residue which contains no sugar, no acid and no recoverable solids from the orange juice.

In any given operation the quantity of water to use in the third step of the centrifugal cycle can be ascertained and controlled by testing the Brix value of the second concentrate and of the ice. Exemplary values can be given. In a particular centrifuge cycle in which 31½ pounds of first concentrate of 26° Brix value was recovered, the use of 7 pounds of tap water in steps 3 and 4 gave a second concentrate of 24° Brix value and an ice residue of no Brix value. In nine complete successive cycles 936 pounds of first concentrate averaging 26° Brix were recovered, and the use of 261 pounds of water produced a second concentrate averaging 24° Brix and an ice residue of 0° Brix.

While the preferred washing procedure has been described above, variations are possible without departing from the spirit of the invention. Thus it is possible to wash the ice crystals (*a*) with fresh juice, (*b*) with concentrate otherwise formed in the process or (*c*) with water derived from the thawing of the ice crystals in tank 37 hereinafter described.

Any of these expedients have the advantage that nothing need be added in the process which is not juice itself or something derived from juice. Sometimes this is of importance in view of governmental regulations. Using fresh juice as the washing medium it is readily possible to obtain a second concentrate of high Brix value, but, while the Brix value of the ice residue can be quite low, it is not generally feasible to reduce it to zero. This condition is exaggerated somewhat when a previously formed concentrate is used; but the value of the washing step remains. The only disadvantage of using water derived from the thawing of the ice residue is that less cold water may be available for use in the cooling section of the pasteurizer. However, artificial refrigeration can be employed in whole or in part in lieu of the cold water.

The two concentrates formed as described above are kept separate in the process. The water used to displace the occluded liquid enters the centrifuges through lines 33 and 34, and the second concentrate is delivered through dotted conduits in the figure to a separate tank 35.

At the end of the centrifuging cycle, a scraper within the centrifuge basket removes the greater part of the ice residue to a trough 36 provided with a screw conveyer; and the ice residue ultimately is deposited in an ice tank 37 provided with an agitator. A relatively thin "filter cake" of ice is usually left in the centrifuge basket, and the centrifuging cycle is then repeated.

Some melting of the ice occurs in the tank 37, and the resultant cold liquid or partial slurry is delivered by a pump 38 and a conduit 39 to the chilling section of the pasteurizer 6 where it cools the preheated juice as described above. The cooling water returns to the ice tank 37 through a conduit 40. As more ice is added from the centrifuges an equivalent amount of water is drained from the ice tank and discarded.

The first concentrate from the centrifuges is delivered from tank 32 by means of a pump 41 through a conduit 42 to a pair of blend tanks 43 and 44. Here it is blended with cold pack or hot pack concentrate as will later be described. The conduit 9 by means of which the highly flavored first concentrate can be delivered to supply tank 8 for adjusting the raw juice is a branch line from conduit 42.

There is shown diagrammatically at 45 an apparatus for making evaporative concentrate. It is fed through a line 46 from an evaporator feed tank 47. Raw juice may be delivered to the evaporator feed tank from the pasteurizer 6 though a conduit 48 as indicated.

It has been found that the liquid which clings to the surfaces of the ice crystals after the second centrifuging step is very rich in the pectin esters of the fruit juice. It is believed that these pectins control to a large extent the quantity of concentrate which clings to the ice. As a consequence the second concentrate, i.e. the concentrate collected in tank 35, will contain almost all of the pectin esters. While a conduit 49 has been shown whereby the second concentrate or some of it can be delivered to the supply tank 8, it has been found that if the second concentrate is mixed without pretreatment with the first concentrate, or with the adjusted juice in tank 8, the pectins tend to create a slight gel, the effect of which is largely to cause the reconstructed product to separate more quickly upon standing. This is ordinarily undesirable. As a consequence it is preferred to deliver the second concentrate from tank 35 by means of a pump 50 and conduit 51 to the evaporator feed tank 47. The evaporation procedure tends to stabilize the pectins and less gel is formed.

The evaporative concentrate from apparatus 45 is delivered by a conduit 52 to an evaporative concentrate holding tank 53 located adjacent the blend tanks 43 and 44. The conduit 12 whereby some of the evaporative concentrate may be delivered to the supply tank 8 is a branch of conduit 52. In the blending tanks the first concentrate is mixed ith the evaporative concentrate as set forth above to provide a final product of desired Brix value. In an exemplary but not limiting practice, the concentrates are blended to give a product of 42° Brix designed for reconstitution on a 1:4 basis.

The final product from the blend tanks 43 and 44 is delivered through a conduit 54 and pump 55 to a scraped surface cooler or votator 56 where its temperature is reduced to 18° F. or thereabouts. Due to the pressure in the votator 56 the material can be delivered and filled into containers at the station 57. It normally congeals within these containers which then may be shipped and stored under suitable conditions of refrigeration.

The orange skins from which the juice is pressed are ordinarily processed for fertilizer or similar uses, although in some processes essential oils may be recovered from them. The excess pulp separated from the initial juice may be similarly processed for fertilizer. However, there are uses for the pulp, which, of course, contains some juice and flavoring esters.

The pulpy juice from the pulp separator is shown delivered by a conduit 58 to a tank 59. It is withdrawn from the tank as required by a pump 60 and delivered by a conduit 61 to a mixer 62. Here it may be mixed with concentrate entering through a conduit 63. This concentrate may be the 26° Brix first concentrate, the 24° Brix second concentrate or the 58° Brix evaporative concentrate, or mixtures of any of them.

The mixture may be delivered by a pump 64 to one or more homogenizers 65 and 66. Among other functions, the homogenizers act to grind up or otherwise render coarse pulp fine. The homogenized product may be filled into containers at a station 67. The material so filled may be in the form of a high-pulp product of, say, about 33° Brix value. Such a product if of full flavor, is of value in the making of bases for the production of extended juices in accordance with the teachings of the copending application in the names of Sperti and Cook, Serial No. 648,000, filed March 27, 1957, and entitled Methods of Making Extended Citrus Juice and Citrus Juice Product.

The manufacture of a 26° Brix full-flavored first concentrate has been described as exemplary since it represents an ideal condition from the standpoint of ease, simplicity, accuracy of control and economy. However, by varying the conditions it is readily possible to manufacture first concentrates in the way set forth ranging in Brix value from about 24° to about 33°. Full-flavored concentrates can be made by the freezing procedure with Brix values of 33° up to and beyond 58° providing the freezing and separation be carried on in more than one stage.

Thus a 26° Brix first concentrate can be made in exactly the way described above. This concentrate can then be re-frozen. For this purpose the concentrate would not preferably be sent through the superfreezers a second time, but on the contrary merely treated in a cold-wall tank with scraper agitation until a slurried product containing ice crystals is obtained. This product is then centrifuged, and a higher Brix concentrate of full flavor is thereby obtained.

It is characteristic of the second centrifuging procedure in the two-stage procedure just outlined, that as the Brix value rises it becomes more difficult to remove the concentrate from the ice crystals by the use of water in the way outlined in the exemplary embodiment. When the Brix value approaches or exceeds about 35°, no clean separation can be effected by a water treatment so as to produce an ice residue of near 0° Brix value. Thus it becomes economically desirable to melt the second-stage ice and recover the solids by an evaporative concentration process. This is why for most purposes it is preferred to produce a full-flavored concentrate of around 26° Brix, and then adjust the Brix value by blending as described.

It will be understood that a 26° Brix concentrate has certain uses as such. Although local and state regulations in some instances prescribe a higher Brix value in a product to be marketed under the term "concentrate," a 26° Brix product is useful and may be sold for manufacturing uses, such as the production of orange drinks, bakery goods, and the like.

Modifications may be made in the invention without departing from the spirit of it. The invention having been described in an exemplary embodiment, what is claimed as new and desired to be secured by Letters Patent is:

1. A process of producing a concentrate from a beverage liquid containing flavoring esters, which process comprises introducing and recirculating the beverage liquid in a closed recirculatory system while subjecting the liquid to freezing temperatures, maintaining the recirculating liquid in a state of continuous agitation to convert it into a pumpable slurry having an ice crystal size of less than about $\frac{1}{32}$ inch in the greatest dimension, continuously removing a portion of the slurry so formed from the recirculatory system and subjecting it to centrifugal separation to remove the ice crystals from a liquid constituting a first concentrate having a higher Brix value than the original beverage liquid and containing substantially all of the flavoring esters present in the original beverage liquid excepting for that portion thereof which clings to the ice crystals, and thereafter subjecting the ice crystals to a single washing treatment with water under centrifugal conditions, said washing treatment being conducted with the ice crystals at a temperature below the freezing point and with the washing water and at temperature above the freezing point, the quantity of water employed being proportioned to provide a second concentrate having a Brix value closely approaching the Brix value of the first concentrate, and an ice residue having substantially no Brix value.

2. The process claimed in claim 1 wherein said beverage liquid is orange juice, wherein prior to subjecting said beverage liquid to freezing conditions, the Brix value thereof is adjusted to a value between substantially 12° and 15°, wherein said first concentrate is blended with an evaporative concentrate formed from another portion of the said orange juice, and wherein said second concentrate is added to that portion of said beverage liquid used in forming said evaporative concentrate.

3. The process claimed in claim 1 wherein said beverage liquid prior to being subjected to said freezing conditions is pasteurized by being heated to a temperature of at least about 170° F. and thereafter immediately cooled, and in which the said cooling is accomplished by bringing said beverage liquid into heat exchange relationship with said ice residue and water melted therefrom.

4. A process of producing a citrus juice concentrate which comprises recirculating the citrus juice in a closed recirculatory system while subjecting the juice to freezing temperatures, maintaining the recirculating juice in a state of continuous agitation to convert it into a mobile slurry containing ice crystals of a size less than about 1/32 inch in the greatest dimension, bleeding slurry from the system and replacing it with additional juice, subjecting the bled slurry to centrifugal separation to separate the ice crystals from the liquid constituent of the slurry to form a first concentrate, and forming a second concentrate by subjecting the ice crystals to a single washing treatment under centrifugal conditions, said washing treatment being conducted using an aqueous liquid having a substantially lower Brix value than said first concentrate and with the ice crystals at a temperature below the freezing point and the aqueous liquid at a temperature above the freezing point, the quantity of aqueous liquid employed being proportioned to provide a second concentrate having a Brix value closely approaching the Brix value of said first concentrate, and ice residue having substantially no Brix value.

5. The process claimed in claim 4 in which said citrus juice is orange juice.

6. The process claimed in claim 4 wherein the Brix value of the orange juice subjected to said freezing conditions is first adjusted to a value of substantially 12° to 15° by the addition thereto of a material chosen from a class consisting of the said concentrates and mixtures thereof.

7. The process claimed in claim 5 including the step of blending the said first concentrate with an evaporative concentrate formed from orange juice, and wherein a portion at least of said second concentrate is added to the orange juice used for the formation of said evaporative concentrate.

8. A process of making an orange juice concentrate which comprises recirculating orange juice in a closed recirculatory system while subjecting the juice to freezing conditions, maintaining the recirculating juice in a state of continuous agitation to convert it into a slurry containing a liquid and ice crystals having a size of less than about 1/32 inch in their greatest dimension, subjecting said slurry to centrifugal separation to separate said liquid from said ice crystals, treating said ice crystals with water under centrifugal conditions and with the ice crystals at a temperature well below their freezing point to recover a second concentrate of substantially the same Brix value as said first concentrate and an ice residue of substantially no Brix value, said second concentrate containing most of the pectins resident in the orange juice, and heat treating said second concentrate to stabilize the pectins therein.

9. A process of making an orange juice concentrate which comprises recirculating orange juice in a closed recirculatory system while subjecting the juice to freezing conditions, maintaining the recirculating juice in a state of continuous agitation to convert it into a slurry containing a liquid and ice crystals of a size less than about 1/32 inch in their greatest dimension, centrifuging said slurry to separate said liquid from said ice crystals, the said separated liquid forming a first concentrate, subjecting the separated ice crystals to a single washing treatment with fresh orange juice under centrifugal conditions, said washing treatment being conducted with the ice crystals at a temperature below the freezing point and with the fresh orange juice at a temperature above the freezing point, the quantity of fresh orange juice employed being proportioned to provide a second concentrate of substantially the same Brix value as said first concentrate and ice residue of substantially no Brix value.

References Cited in the file of this patent

UNITED STATES PATENTS

| | | |
|---|---|---|
| 2,167,881 | Eberts et al. | Aug. 1, 1939 |
| 2,354,633 | Bedford | July 25, 1944 |
| 2,448,538 | Mason | Sept. 7, 1948 |
| 2,503,695 | Webb et al. | Apr. 11, 1950 |
| 2,588,337 | Sperti | Mar. 11, 1952 |
| 2,657,555 | Wenzelberger | Nov. 3, 1953 |